United States Patent
Haydock

(10) Patent No.: US 8,151,120 B2
(45) Date of Patent: Apr. 3, 2012

(54) ADDRESSING PERIPHERALS IN AN IC

(75) Inventor: Stephen Nick Haydock, Bristol (GB)

(73) Assignee: STMIcroelectronics (Research & Development) Ltd., Buckinghamshire (GB)

(*) Notice: Subject to any disclaimer, the term of this patent is extended or adjusted under 35 U.S.C. 154(b) by 786 days.

(21) Appl. No.: 11/525,253

(22) Filed: Sep. 21, 2006

(65) Prior Publication Data

US 2007/0106820 A1 May 10, 2007

(30) Foreign Application Priority Data

Sep. 22, 2005 (EP) .................................... 05255900

(51) Int. Cl.
*G06F 21/00* (2006.01)
(52) U.S. Cl. ....................................................... 713/190
(58) Field of Classification Search .................. 713/185, 713/189, 193, 190; 711/164, 203
See application file for complete search history.

(56) References Cited

U.S. PATENT DOCUMENTS

| 4,278,837 | A | 7/1981 | Best | |
| 7,263,623 | B1* | 8/2007 | Crosland et al. | 713/324 |
| 2002/0040443 | A1* | 4/2002 | Maeda et al. | 713/320 |
| 2002/0188857 | A1* | 12/2002 | Orlando et al. | 713/193 |
| 2003/0188178 | A1 | 10/2003 | Strongin et al. | |
| 2004/0128458 | A1 | 7/2004 | Buhr | |
| 2004/0181303 | A1* | 9/2004 | Walmsley | 700/115 |
| 2005/0021991 | A1* | 1/2005 | Chabaud et al. | 713/200 |

FOREIGN PATENT DOCUMENTS

FR  2 857 804   1/2005
WO  WO 2004/046935 A2  6/2004

* cited by examiner

*Primary Examiner* — Gilberto Barron, Jr.
*Assistant Examiner* — Shaun Gregory

(57) ABSTRACT

An integrated circuit, method of making an integrated circuit and method of addressing peripherals of an integrated circuit are disclosed for preventing copied software from running on unauthorized hardware. A permanent key is embedded in the integrated circuit and used to transform a peripheral access address output by a processor of the integrated circuit. The transformed access address is supplied to a peripheral address decoder f the integrated circuit, which allows the processor to access a corresponding peripheral. A method of supplying integrated circuits to prevent copied software from running on unauthorized hardware is also disclosed.

25 Claims, 5 Drawing Sheets

US 8,151,120 B2

ADDRESSING PERIPHERALS IN AN IC

CROSS-REFERENCE TO RELATED APPLICATION AND CLAIM OF PRIORITY

The present disclosure is related to European Application No. 05255900.2, filed Sep. 22, 2005, entitled "ADDRESSING PERIPHERALS IN AN IC". European Application No. 05255900.2 is assigned to the assignee of the present application and is hereby incorporated by reference into the present disclosure as if fully set forth herein. The present application hereby claims priority under 35 U.S.C. §119(e) to European Application No. 05255900.2.

TECHNICAL FIELD

The present disclosure relates to addressing peripherals in integrated circuits, such as those having a processor arranged to access a plurality of peripherals, and to methods of making and supplying such integrated circuits.

BACKGROUND

It is common for an integrated circuit to comprise a processor and a plurality of peripheral devices all incorporated onto the same chip. The processor executes software that controls the behaviour of the processor with respect to the peripherals, and in particular the way in which the peripherals are accessed.

For example, such integrated circuits may include peripherals such as an UART (Universal Asynchronous Receiver Transmitter) peripheral for transmitting and receiving data asynchronously via the serial port of a computer, a PTI (Programmable Transport Interface) peripheral used to demultiplex DVB standard transport data streams, a timer, an FDMA (Flexible Direct Memory Access) peripheral for moving data from memory to memory and an MPEG (Moving Picture Experts Group) peripheral. The MPEG peripheral may handle, for example, digital video functions according to the MPEG standard and decode frames in a compressed MPEG2 video stream into pictures suitable for display.

The integrated circuits themselves may be suitable for a wide variety of applications such as, for example, in consumer electronics (e.g., set-top boxes, DVD players, handheld computers and mobile telephones).

FIG. 1 shows a conventional integrated circuit device (or chip) 10. Integrated circuit 10 comprises a plurality of peripheral devices 8 such as those described above, and a processor 2 for executing software. Processor 2 is operable, upon executing an instruction to access a peripheral, to output a corresponding peripheral access address onto address bus 4. Address bus 4 connects between Processor 2 and peripheral address decoder 6. Peripheral address decoder 6 is operable to allow processor 2 to access peripheral 8 corresponding to the address appearing on bus 4. In this way, peripheral address decoder 6 maps access addresses onto respective peripherals 8 of integrated circuit 10. The correlation between the access addresses and their respective peripherals 8 is referred to as an "address map".

Such devices, however, are susceptible to cloning. FIG. 1A shows printed circuit board (PCB) 1 on which is mounted integrated circuit 10 running software 12. If it is possible for an unscrupulous party to obtain information relating to the design of PCB 1, then it may be possible to produce a cloned PCB 1a that functions in a substantially similar manner to the original PCB 1. If integrated circuit 10a can be sourced, ostensibly for use with software from another vendor, or in another market, copy 14 of the required software can be obtained, allowing a fully operational replica of the product to be produced without the authorization of the software vendor. It is difficult to physically prevent a PCB from being cloned.

There is therefore a need to provide some kind of obstacle to the cloning process. In particular, there is a need to prevent copying of software on, for example, unauthorized hardware platforms.

SUMMARY

To address the above-discussed deficiencies of the prior art, an object of the present disclosure is to prevent software from running on unauthorized hardware.

According to one embodiment of the present disclosure, an integrated circuit is disclosed. The integrated circuit includes a processor, a set of peripherals, and a permanent key. The integrated circuit also includes a transform logic arranged to receive at least one access address from the processor and to transform said at least one access address in dependence on the value of the permanent key to produce a transformed access address. The integrated circuit also includes a peripheral address decoder arranged to receive access addresses including said at least one transformed access address from the processor and to map a respective access address onto each of said peripherals so as to allow the processor to access a corresponding one of said peripherals.

According to another embodiment of the present disclosure, there is provided a method of addressing a peripheral in an integrated circuit comprising a processor and a set of peripherals. The method includes receiving an access address from the processor and transforming said access address in dependence on a permanent key incorporated into the integrated circuit to generate a transformed access address. The method also includes using the transformed access address to allow the processor to access a corresponding one of said peripherals.

According to still another embodiment of the present disclosure, there is provided a method of making an integrated circuit. The method includes providing a processor and a set of peripherals and incorporating a permanent key into the integrated circuit. The method also includes providing a transform logic arranged to receive at least one access address from the processor and to transform said at least one access address in dependence on the value of the permanent key to generate a transformed access address. The method further includes providing a peripheral address decoder arranged to receive access addresses including said at least one transformed access address from the processor and to map a respective access address onto each of said peripherals so as to allow the processor to access a corresponding one of said peripherals.

In order for the peripheral address decoder to access a peripheral, software which is produced for the integrated circuit must know the transformed access addresses of the peripherals. That is, the peripheral address decoder must ascertain the transformed address map that results from a particular value of a permanent key. Thus, software produced using an address map corresponding to one particular value of the permanent key cannot drive the peripherals of an integrated circuit having a different value of the permanent key. The permanent key is preferably made inaccessible on the chip, and its value kept secret. Thus, the permanent key is difficult to clone.

The permanent key may comprise a code written to a fuse latch. The permanent key may comprise a code held in a ROM (Read Only Memory). The permanent key may be of a conventional permanent key found in chips for another purpose, such as to identify the chip or to enable a particular scrambling or descrambling mode.

The transform logic may comprise a series of logic gates. The logic gates may comprise XOR (exclusive OR) gates. The logic gates may each be arranged with one input connected to a respective bit of the permanent key and one input connected to a respective bit of the address output by the processor. Alternatively, the transform logic may comprise a look-up table.

The above arrangement constitutes a physical barrier to resist the execution of copied software on unauthorized hardware. It is possible to achieve a similar effect by a method of supplying integrated circuits as defined below.

According to still another embodiment of the present disclosure, there is provided a method of supplying integrated circuits to first and second users. Each integrated circuit includes a processor, a set of peripherals, and an address map for mapping a respective access address onto each of said peripherals. The method includes supplying a first integrated circuit having a first address map to the first user, and supplying a second integrated circuit having a second address map to a second user. The first and second integrated circuits are functionally identical except in that the first address map is different from the second address map. Thus, software produced for the first integrated circuit will not run on the second integrated circuit.

As described more fully below, embodiments of the present disclosure ensure that IC 10 is made unique to one market, while still allowing manufactures of chips such as, for example, integrated circuit 10a, to provide an identical set of features for other markets. In addition, manufacturing can provide identical sets of features to software/hardware vendors without the risk of cloning.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the present disclosure and to show how the same may be carried into effect, reference will now be made, by way of example, to the corresponding drawings, in which like reference numerals represent like parts, and in which.

DETAILED DESCRIPTION

FIGS. 2 through 6, discussed below, and the various embodiments used to describe the principles of the present disclosure in this patent document are by way of illustration only and should not be construed in any way to limit the scope of the invention. Those skilled in the art will understand that the principles of the present disclosure may be implemented in any suitably arranged integrated circuit.

Figure 1A:
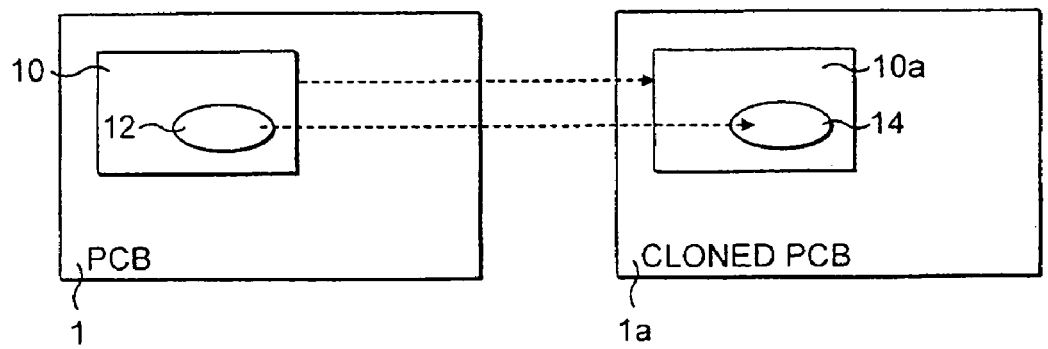
FIG. 1A illustrates a situation in which copied software is run on cloned hardware.
Figure 1:
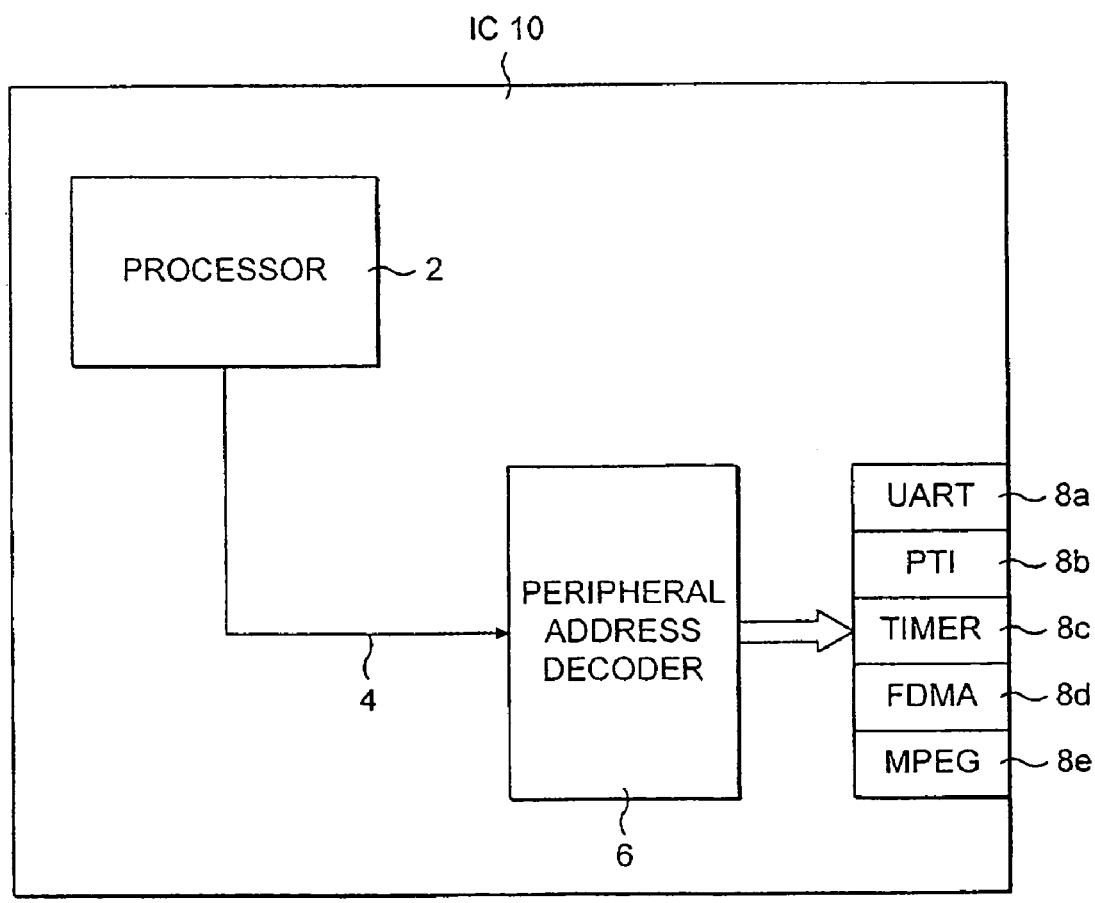
FIG. 1 illustrates a conventional integrated circuit.
Figure 2:
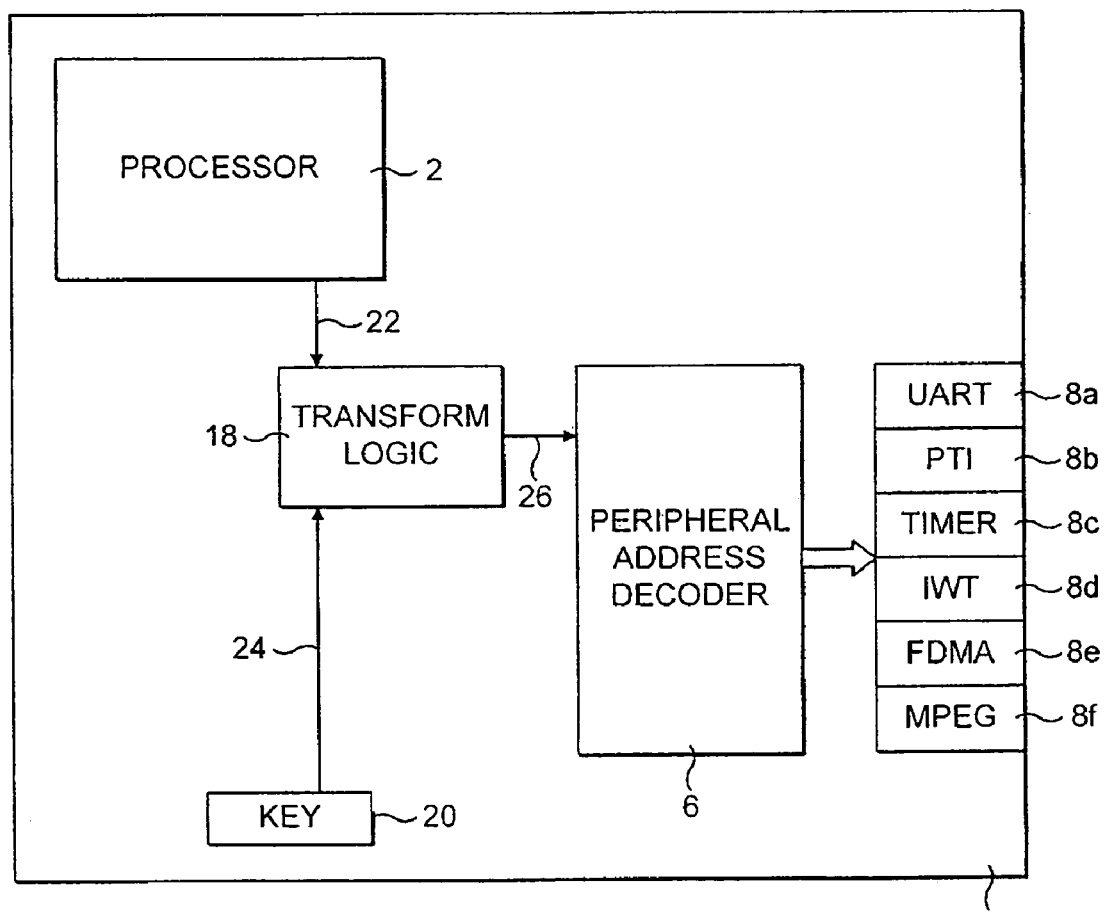
FIG. 2 illustrates an integrated circuit according to one embodiment of the present disclosure.

FIG. 2 illustrates integrated circuit device (or chip) 10 in accordance with one embodiment of the present disclosure. Integrated circuit 10 includes processor 2 for executing software and outputting peripheral access addresses, a plurality of peripherals 8, and peripheral address decoder 6 for receiving peripheral access addresses and allowing processor 2 to access the corresponding peripherals B. In this example, the peripherals include UART peripheral 8a, PTI peripheral 8b, timer Bc, FDMA peripheral 8d, and MPEG decoder peripheral 8e (collectively referred to herein as peripherals 8). However, it should be understood that other embodiments may comprise any suitable combination of these and/or other peripherals, as appropriate to the application for which integrated circuit 10 is intended. Processor 2, peripheral address decoder 6, and/or peripherals 8 may be similar or identical to those described in conjunction with the description accompanying FIG. 1.

Integrated circuit 10 also includes permanent key 20. Permanent key 20 is generally a value embodied in a permanent storage means of integrated circuit 10. For example, the permanent storage means may be a fuse latch, ROM included on the chip or some other suitable means. Integrated circuit 10 further includes transform logic 18 for transforming peripheral access address received at one input of transform logic 18 in dependence on a value received at another input of transform logic 18.

Processor 2 is connected to transform logic 18 by processor output address bus 22. Permanent key 20 is connected to transform logic 18 by key bus 24. Transform logic 18 is connected to the peripheral address decoder 6 by transformed address bus 26.

Figure 3:
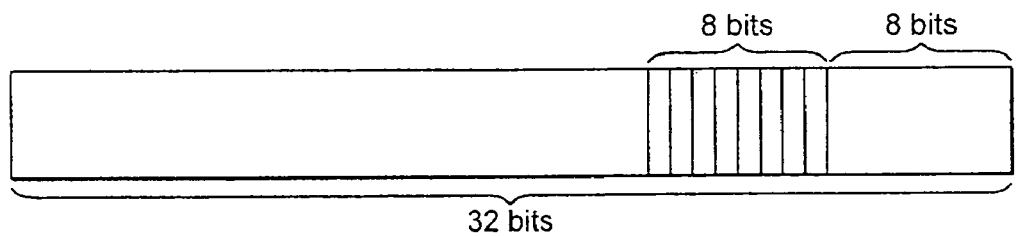
FIG. 3 illustrates a processor output address bus according to one embodiment of the present disclosure.

As illustrated in FIG. 3, only a particular range of bits on processor output address bus 22 may be reserved for addressing peripherals 8 of integrated circuit 10. In the example shown, the second eight bits of a thirty-two bit bus are reserved for peripheral 8. The remaining bits may be used for other purposes such as addressing external devices or as control bits. However, for the purpose of this disclosure, where reference is made to the processor output address or processor output address bus 22 (or similar), it is intended only to refer to those bits that are used to address peripherals 8.

In operation, when software running on the processor 2 instructs processor 2 to access one of peripherals 8, a corresponding access address is output on processor output address bus 22. This is the address at which the software "sees" peripheral 8. The address on processor output address bus 22 is received by transform logic 18 and transformed according to the value of permanent key 20 that is input via key bus 24. The transformed access address is then output on transformed address bus 26 and decoded by peripheral address decoder 6 in order to allow processor 2 to access the desired peripheral 8.

Thus, if a software developer is given a transformed address map corresponding to a particular value of permanent key 20, then the software produced using that mapping will associated with a given peripheral 8 with an address different from peripheral address decoder 6. The translation between the two addresses is only possible using the correct transform logic 18 and value of permanent key 20. If transform logic 18 is absent, then there will be no translation of the address output by processor 2 and so peripheral address decoder 6 will not associate this address with the intended peripheral 8. Similarly, if the value of key 20 is incorrect, the translation will be incorrect and so peripheral address decoder 6 will not associate the transformed address with the intended peripheral. Thus, software developed for a particular key value will be unable to drive peripherals 8 of an integrated circuit having a different value. In this way, software can be tied to a particular group of chips such as, for example, to the chips supplied to a particular authorized software developer.

Note that the software developer need not know the value of permanent key 20, but only the corresponding transformed address map. Further, permanent key 20 is preferably made inaccessible and its value is written only shortly before sale. Thus, the value of key 20 can be kept secret, making it difficult for a useful clone of integrated circuit 10 to be produced.

In one embodiment, permanent key 20 may be written to a fuse latch of the integrated circuit. The fuse latch includes a series of fuse elements 28 that are selectively blown in order to permanently program a digital number into the latch. This option is particularly advantageous since some integrated circuits may already include a fuse latch for other reasons, such as to identify the chip as being of a particular type (e.g., NDS) or to enable a particular scrambling or descrambling mode used to encode/decode data transmitted on or off chip. Thus, by using or extending an existing fuse latch, it is possible to minimise the amount of additional circuitry required on the integrated chip 10. It should be understood, however, that other means for storing permanent key 20 could be used, such as a Read-Only Memory (ROM). Note that the term "permanent key" denotes a key that is impossible, difficult or at least inconvenient to erase or reprogram.

Figure 4:
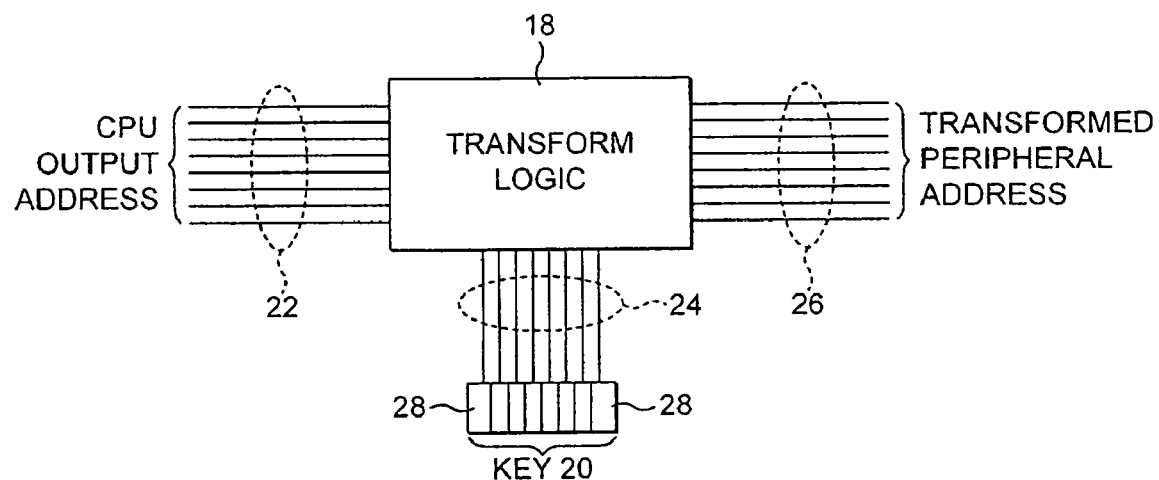
FIG. 4 illustrates a permanent key, transform logic and associated connections according one embodiment of the present disclosure.

Another embodiment is described with reference to FIGS. 4 and 5. As shown in FIG. 4, an eight-bit permanent key 20 is stored in eight one-bit fuse elements 28, one for each bit of processor output address bus 22.

When a peripheral needs accessing, transform logic 18 receives an address output by processor 2 via processor output address bus 22. Transform logic 18 is also connected to each fuse element 28 of permanent key 20 via a respective line of key bus 24. Transform logic 18 transforms the address input from processor 2 based on the bits stored in fuse elements 28 of permanent key 20, and outputs a transformed peripheral access address on transformed address bus 26.

Figure 5:
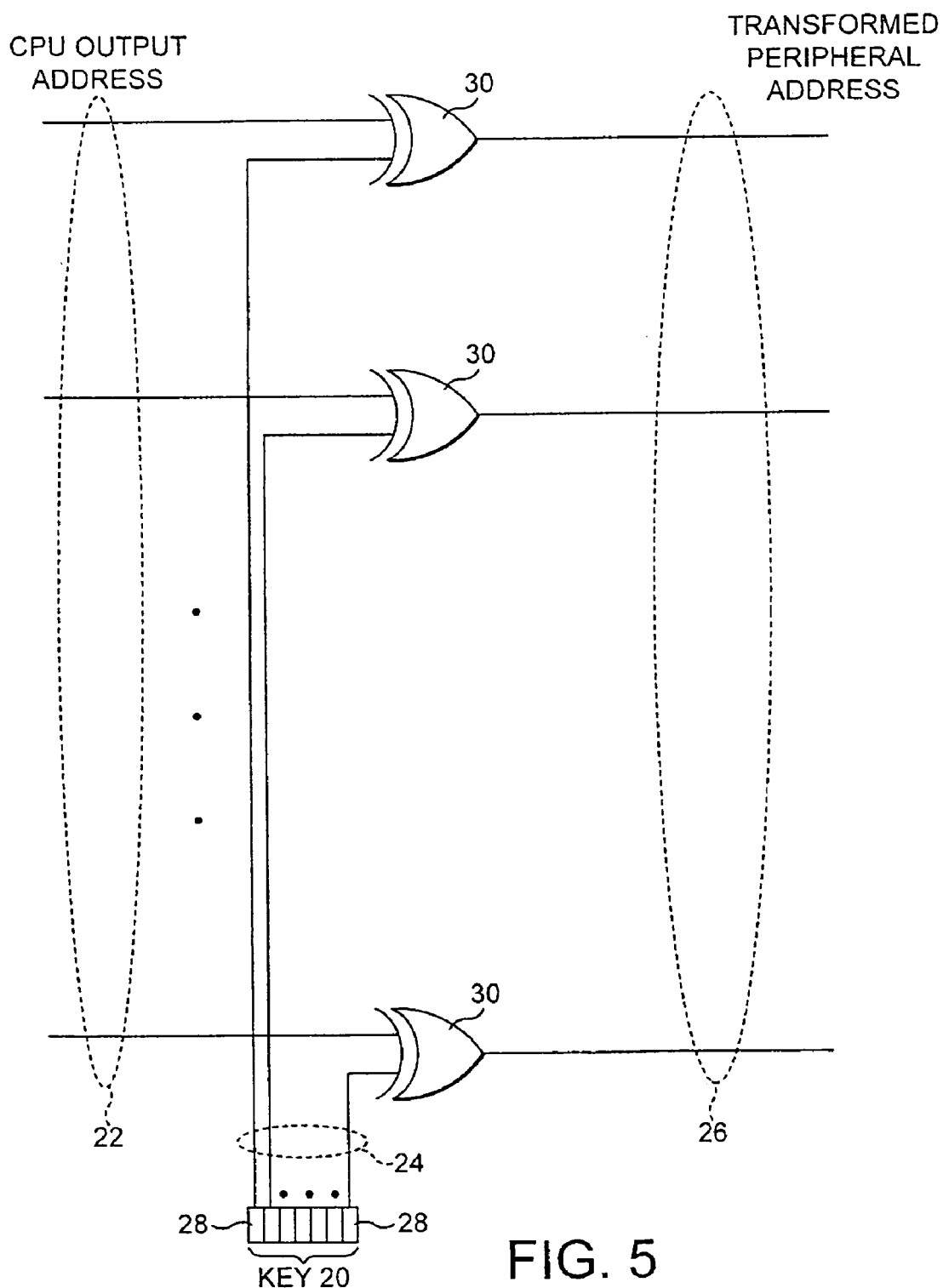
FIG. 5 illustrates a detailed example of the permanent key depicted in FIG. 4.

FIG. 5 illustrates an exemplary circuit for the transform logic 18 in accordance with one embodiment of the present disclosure. The circuit includes a set of eight XOR gates 30. Each XOR gate 30 has a first input connected to a respective one of fuse elements 28, the connections between XOR gates 30 and fuse elements 28 forming key bus 24. Each XOR gate 30 also has a second input connected to a respective bit of processor output address bus 22. The outputs of XOR gates 30 form transformed address bus 26.

Accordingly, if a given fuse element 28 is set at logic-0, the corresponding XOR gate 30 will be transparent and the bit output by that gate will be equal to the bit input from processor 2. On the other hand, if the fuse element is set at logic-1, the bit output by the corresponding XOR gate 30 will be the complement of the bit input from processor 2. In this way, the processor output address will be transformed in dependence on the value of permanent key 20. Other suitable gate arrangements will be apparent to those skilled in the art. This arrangement requires a small amount of additional circuitry on the integrated circuit. Moreover, no extra machine cycles are required for peripheral access.

In another embodiment, the transform logic includes a look-up table, whereby an input access address from processor 2 is referenced against a table of output addresses in dependence on the value of permanent key 20. However, this option is not preferred since it is generally more expensive and incurs additional machine cycles.

In still other embodiments, the transformation is applied to the addresses of all the peripherals. However, it will be appreciated that the transformation could be applied to only some or even one of the addresses. Particularly, unauthorized parties would still be deterred from cloning if the transformed address corresponded to a peripheral 8 that was essential for a wide range of applications such as, for example, the MPEG decoder peripheral.

In yet another embodiment, transform logic 18, permanent key 20 and peripheral address decoder 6 are implemented in separate components of the integrated circuit. However, in alternative embodiments, one or both of transform logic 18 and permanent key 20 may be incorporated within peripheral address decoder 6, and/or transform logic 18 and permanent key 20 may be implemented in the same component.

Figure 6:
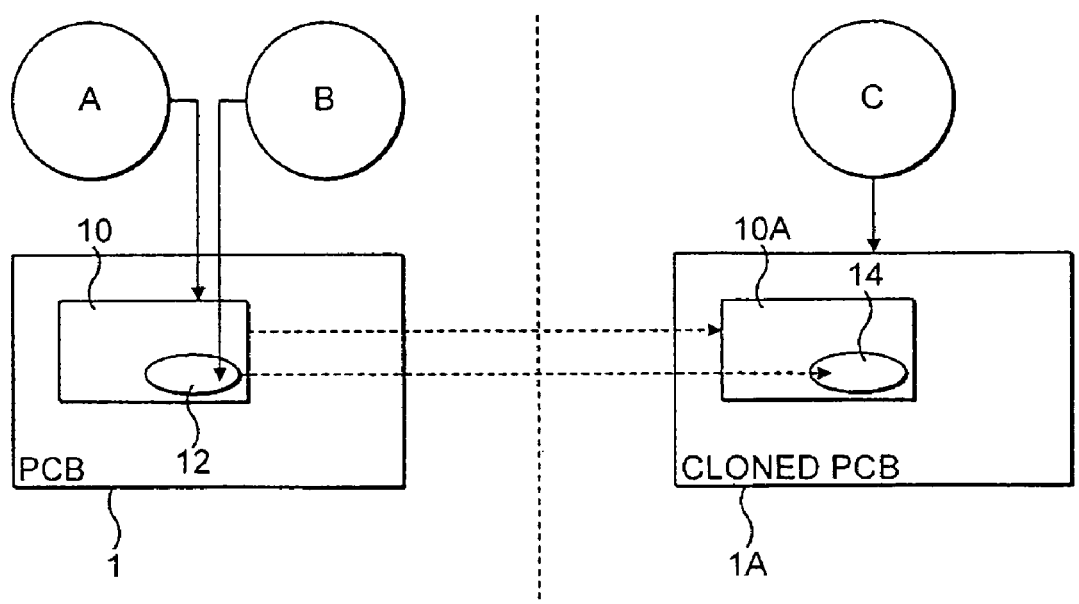
FIG. 6 illustrates an exemplary application in accordance with one embodiment of the present disclosure.

An exemplary application of the present disclosure is now described with reference to FIG. 6. Manufacturer A produces integrated circuit 10 to which is written a particular value of permanent key 20, and provides software developer B with a transformed address map that corresponds to that value. The address map may be distributed, for example, in the form of a header file for use when the software is compiled and linked. Software developer B is then able to produce software 12 that will correctly drive peripherals 8 of integrated circuit 10. However, if a third party C attempts to clone PCB 10, then the version of IC 10a that is sold will not be written with the correct value of permanent key 20, or perhaps even will not include transform logic 18 and permanent key 20 at all. As a result, software 16 copied from developer B will be useless when run on the cloned hardware 14, since the copied software 16 will use a different peripheral address mapping than the cloned chip 14. Therefore, a third party is prevented from running copied software on unauthorized hardware.

In another exemplary application in accordance with the present disclosure, the manufacturer A supplies hardware to both parties B and C, but with one address map used in integrated circuit 10 supplied to B and another address map used in integrated chip 10a supplied to C. Integrated circuits 10 and 10a are supplied to both B and C are functionally identical, except in that they use different address maps. In a preferred embodiment, this is achieved by writing one value of permanent key 20a to integrated circuit 10 supplied to B and writing a different value of permanent key 20 to integrated circuit 10 supplied to C. In an alternative embodiment, the same is achieved by supplying B with chips that use a different peripheral address decoder 6 (with different a peripheral address map) than the chips supplied to C. In either case, C is prevented from running software copied from B because B's software is produced using an address map that does not match the peripheral mapping of the chips supplied to C. Party C can only run software specifically produced for C's own hardware. It is intended that the present disclosure encompass such changes and modifications as fall within the scope of the appended claims.

What is claimed is:

1. An integrated circuit comprising:
   a processor;
   a set of peripherals;
   a permanent key stored in the integrated circuit;
   transform logic configured to receive at least one access address from the processor and to transform the at least one access address into a transformed access address using a value of the permanent key; and
   a peripheral address decoder configured to receive access addresses including the at least one transformed access address from the processor and to map a respective transformed access address onto each of the peripherals so as to allow the processor to access a corresponding one of the peripherals, the processor only supplying the access address in order to access the peripherals.

2. The integrated circuit according to claim 1, wherein the permanent key is written to a fuse latch of the integrated circuit.

3. The integrated circuit according to claim 1, wherein the permanent key is held within a ROM of the integrated circuit.

4. The integrated circuit according to claim 1, wherein at least part of the permanent key is arranged to provide another chip-related function in addition to its function in transforming an access address of a peripheral.

5. The integrated circuit according to claim 4, wherein the permanent key provides at least one of the functions of: identifying the integrated circuit, enabling a scrambling mode, and enabling a descrambling mode.

6. The integrated circuit according to claim 1, wherein the transform logic comprises a set of logic gates.

7. The integrated circuit according to claim 6, wherein the set of logic gates comprises a set of XOR gates.

8. The integrated circuit according to claim 6, wherein the permanent key comprises a plurality of bits, and the logic gates are each arranged with one input connected to a respective bit of the permanent key and one input connected to a respective bit of the address output by the processor.

9. The integrated circuit according to claim 1, wherein the transform logic comprises a look-up table.

10. The integrated circuit according to claim 1, wherein at least one of the peripherals comprises one of the following: a UART peripheral, a PTI peripheral, a timer, an FDMA peripheral, and an MPEG decoder peripheral.

11. The integrated circuit according to claim 1, wherein the integrated circuit is suitable for use in at least one of: a set-top box, a DVD player, a handheld computer and a mobile telephone.

12. The integrated circuit according to claim 1, wherein the peripheral address decoder, transform logic and permanent key are each implemented on separate components on the integrated circuit.

13. The integrated circuit according to claim 1, wherein at least two of the peripheral address decoder, transform logic and permanent key are incorporated into a same component of the integrated circuit.

14. A method of addressing a peripheral in an integrated circuit comprising a processor and a set of peripherals, the method comprising:
   receiving an access address from the processor;
   transforming the access address into a transformed access address using a permanent key incorporated into the integrated circuit; and
   using the transformed access address to allow the processor to access a corresponding one of the peripherals, the processor only supplying the access address in order to access the peripherals.

15. The method according to claim 14, wherein transforming the access address comprises reading the value of a permanent key from a fuse latch.

16. The method according to claim 14, wherein transforming the access address comprises reading the value of a permanent key from a ROM.

17. The method according to claim 14, further comprising using the permanent key to provide another chip-related function in addition to transforming an access address of a peripheral.

18. The method according to claim 17, wherein providing another chip-related function comprises providing at least one of the functions of: identifying the integrated circuit, enabling a scrambling mode, and enabling a descrambling mode.

19. The method according to claim 14, wherein the permanent key comprises a plurality of bits, and transforming the access address comprises performing a logic operation on each bit of the access address in conjunction with a respective bit of the permanent key.

20. The method according to claim 19, wherein the logic operation comprises taking the exclusive-OR of the bit of the access address and the respective bit of the permanent key.

21. A method of making an integrated circuit, the method comprising:
   providing a processor and a set of peripherals;
   incorporating a permanent key into the integrated circuit;
   providing a transform logic to receive at least one access address from the processor and to transform the at least one access address into at least one transformed access address using a value of the permanent key to generate a transformed access address, wherein the at least one transformed access address is generated using a transform logic comprising a plurality of logic gates; and
   providing a peripheral address decoder arranged to receive access addresses including the at least one transformed access address from the processor and to map a respective access address onto each of the peripherals so as to allow the processor to access a corresponding one of the peripherals, the processor only supplying the access address in order to access the peripherals.

22. A method of supplying integrated circuits to first and second users, each integrated circuit comprising a processor, a set of peripherals, and an address map for mapping a respective access address onto each of the peripherals stored as a permanent key within at least one of the integrated circuits; the method comprising:
   supplying a first integrated circuit having a first address map to the first user, and supplying a second integrated circuit having a second address map to a second user,
   wherein the first and second integrated circuits are functionally identical except in that the first address map is different from the second address map, the first and second access address map are used to provide access to the first and second integrated circuit using at least one transformed access address generated using a transform logic comprising a plurality of logic gates; and
   wherein a processor of the first or second integrated circuits can access the peripherals of the first or second integrated circuits by only supplying the access addresses specified by the respective first or second address map.

23. The method according to claim 22, wherein the first map is the result of a first transformation applied to at least one peripheral access address output by a processor of the first integrated circuit, and the second address map is the result of a second transformation applied to at least one peripheral access address output by a processor of the second integrated circuit.

24. The method according to claim 23, wherein the first transformation is performed based on a value of a first permanent key incorporated into the first integrated circuit, and the second transformation is performed based on a value of a second permanent key incorporated into the second integrated circuit.

25. The method according to claim 22, wherein the first address map is a property of a first peripheral address decoder of the first integrated circuit, and the second address map is a property of a second peripheral address decoder of the second integrated circuit.

* * * * *